United States Patent
Boman et al.

(10) Patent No.: US 6,480,819 B1
(45) Date of Patent: Nov. 12, 2002

(54) AUTOMATIC SEARCH OF AUDIO CHANNELS BY MATCHING VIEWER-SPOKEN WORDS AGAINST CLOSED-CAPTION/AUDIO CONTENT FOR INTERACTIVE TELEVISION

(75) Inventors: Robert Boman, Thousand Oaks, CA (US); Jean-Claude Junqua, Santa Barbara, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/258,115

(22) Filed: Feb. 25, 1999

(51) Int. Cl.$^7$ ............................ G06F 17/27; G10L 15/22
(52) U.S. Cl. ............................ 704/9; 704/275; 704/257
(58) Field of Search ..................... 704/9, 8–10, 243, 704/250, 251, 252, 253, 254, 255, 256, 257, 270, 272, 275

(56) References Cited

U.S. PATENT DOCUMENTS

| | | | |
|---|---|---|---|
| 4,305,131 A | 12/1981 | Best | 345/327 |
| 5,296,931 A | * 3/1994 | Na | 348/731 |
| 5,369,440 A | * 11/1994 | Sussman | 348/462 |
| 5,680,511 A | * 10/1997 | Baker et al. | 704/257 |
| 5,729,659 A | 3/1998 | Potter | |
| 5,748,841 A | * 5/1998 | Morin et al. | 704/257 |
| 5,774,859 A | 6/1998 | Houser et al. | |
| 5,799,276 A | 8/1998 | Komissarchik et al. | |
| 5,809,471 A | 9/1998 | Brodsky | 704/275 |
| 5,890,123 A | * 3/1999 | Brown et al. | 704/275 |
| 5,924,068 A | * 7/1999 | Richard et al. | 704/260 |
| 6,052,554 A | * 4/2000 | Hendricks et al. | 455/5.1 |
| 6,138,098 A | * 10/2000 | Shieber et al. | 704/257 |
| 6,243,676 B1 | * 6/2001 | Witteman | 704/243 |
| 6,246,672 B1 | * 6/2001 | Lumelsky | 370/310 |

FOREIGN PATENT DOCUMENTS

| | | |
|---|---|---|
| EP | 0527650 A2 | 2/1993 |
| EP | 0747881 A2 | 12/1996 |
| EP | 0794670 A2 | 10/1997 |
| EP | 0862159 A1 | 9/1998 |

OTHER PUBLICATIONS

IBM TDB–ACC–NO–NN9508285: "Speech Recognition Methods for Controlling Cable Television".*
P.J. Wyard, et al., "Spoken Language Systems—Beyond Prompt and Response", 8438 BT Technology Journal Jan. 14, 1999, vol. 14, No. 1, Ipswich, Suffok, GB, pp. 187–205.
IBM TDB 08–83 p. 997 Order 83A61678—vol. 26, No. 3A Aug. 1983.
IBM Technical Disclosure Bulletin, *Integrating Speech Technology with Voice Response Units Systems*, vol. 38, No. 10, Oct. 1995, pp. 215–216.
IBM Technical Disclosure Bulletin, *Simplifying Speech Recognition with Individual Usage Patterns*, vol. 38, No. 12, Dec. 1995, p. 381.
IBM Technical Disclosure Bulletin, *Voice Windows*, vol. 38, No. 07, Jul. 1995, p. 461.
IBM Technical Disclosure Bulletin, *Providing Visual and Audio Feedback for Recognition Events*, vol. 39, No. 10, Jan. 1996, p. 75.

* cited by examiner

*Primary Examiner*—Patrick N. Edouard
(74) *Attorney, Agent, or Firm*—Harness, Dickey & Pierce, P.L.C.

(57) ABSTRACT

A method and apparatus is provided to enable a user watching and/or listening to a program to search for new information in the stream of a telecommunications data. The apparatus includes a voice recognition system that recognizes the user's request and causes a search to be performed in the long stream of data of at least one other telecommunication channel. The system includes a storage device for storing and processing the request. Upon recognition of the request, the incoming signal or signals are scanned for matches with the request. Upon finding the match between the request and the incoming signal, information related to the data is brought to the viewer's attention. This can be accomplished by either changing the viewer's station or by bringing in a split screen display forward into the display.

16 Claims, 2 Drawing Sheets

AUTOMATIC SEARCH OF AUDIO CHANNELS BY MATCHING VIEWER-SPOKEN WORDS AGAINST CLOSED-CAPTION/AUDIO CONTENT FOR INTERACTIVE TELEVISION

BACKGROUND AND SUMMARY OF THE INVENTION

The present invention relates generally to interactive television and more particularly, to a system that allows the user to select channels by spoken request.

Interactive television promises to allow two-way communication between the viewer and his or her television set. Although the technology is still in its infancy, digital television is expected to greatly enrich the prospects for interactive TV, because the digital technology makes possible a far more efficient use of available channel bandwidth. Through digital technology, broadcasters can pack a significantly larger number of programs into the available bandwidth of the delivery infrastructure (e.g. cable or satellite).

While the new interactive, digital television technology offers a significant number of benefits to both viewers and broadcasters, it is not without problems. The prospect of having 200 or more channels simultaneously available for viewing boggles the mind. Conventional on-screen electronic program guides are likely to prove inadequate in assisting viewers to find programs they are interested in. Interactive digital television demands a more sophisticated system of interaction if the viewers are ever going to be able to fully utilize this rich new resource.

The present invention provides a speech-enabled interactive system through which a user can specify a desired program content through natural language speech. The system extracts both keyword and semantic content from the user's speech, prompting the user to furnish additional information if the meaning is unclear.

The system then monitors closed caption information on multiple channels simultaneously and switches the active channel tuner or auxiliary tuner to the channel carrying information matching the user's request. If closed caption information is not available, the system will alternatively employ speech recognition upon the audio signal of the channels being monitored. Once the channel has been switched, the program may be displayed in full screen mode, or in split-screen or picture-in-picture mode, or recorded for later viewing.

The speech recognition system works with a semantic analyzer that is able to discriminate between speech intended to describe program content and speech intended to supply meta-commands to the system. By extracting meaning as well as keywords and phrases from the spoken input, the system will find matching content even when the spoken words do not match the closed caption text verbatim.

For a more complete understanding of the invention, its objects and advantages, refer to the following specification and to the accompanying drawings.

DETAILED DESCRIPTION OF THE PREFERRED EMBODIMENTS

Figure 1:
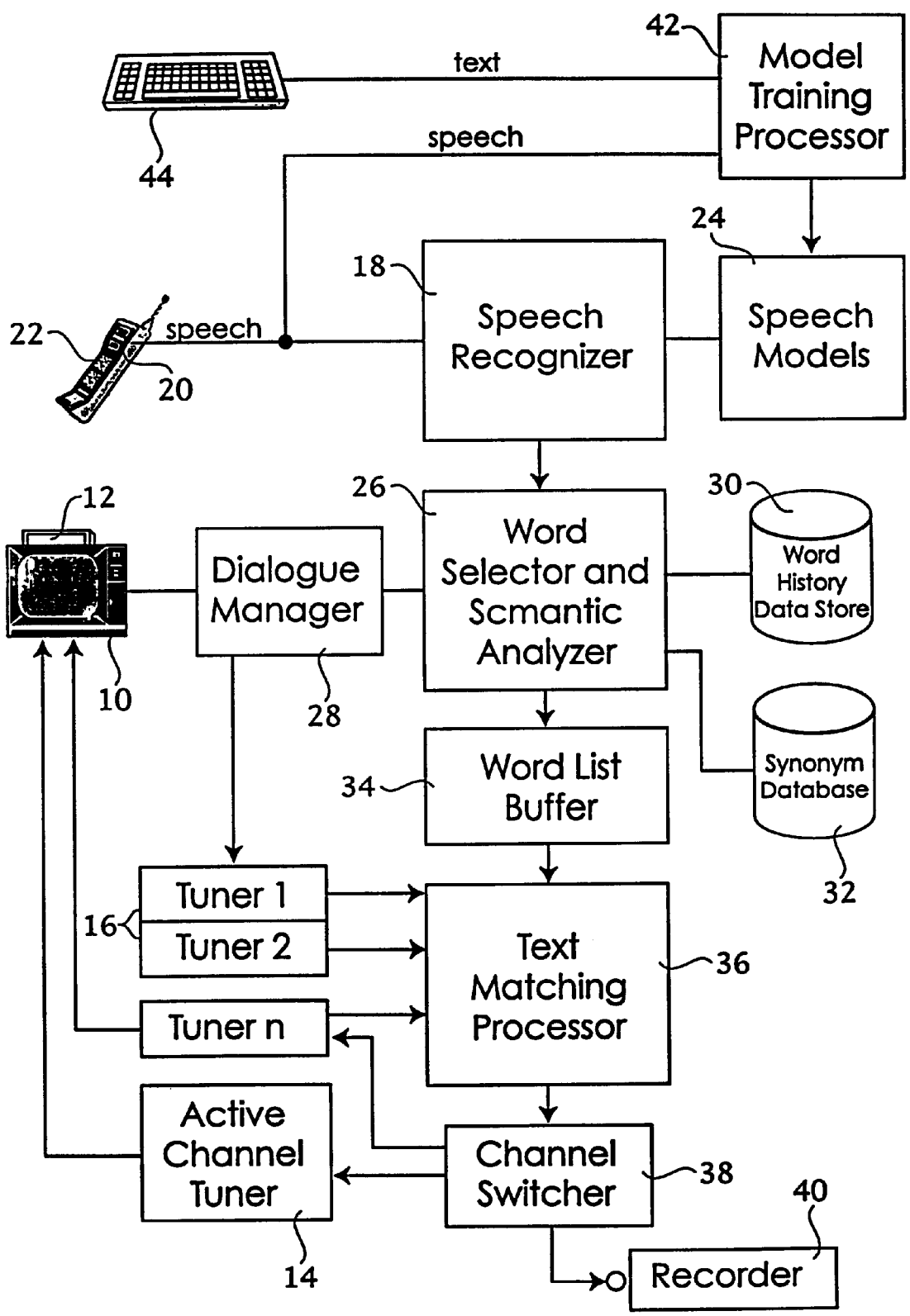
FIG. 1 is a block diagram of a presently preferred embodiment of the invention.

Referring to FIG. 1, the interactive content searching system of the invention may be integrated into the television set 10, or into a set top box 12. In either embodiment, the system is designed to monitor one or more channels not currently being viewed, to detect closed caption text or audio channel speech that matches the user's previously spoken request. In FIG. 1, a plurality of tuners has been illustrated, including an active channel tuner 14 and a plurality of auxiliary tuners 16. In the illustrated embodiment it is assumed that there are n auxiliary tuners (where n is an integer number greater than 0). In its simplest form, the invention may be implemented using a single auxiliary tuner.

The active channel tuner 14 is tuned to a channel set by the user and this tuner thus selects the channel the user is currently watching on television set 10. If desired, one or more of the auxiliary tuners may also supply program content for viewing on television set 10, such as in a split-screen mode or picture-in-picture mode. In FIG. 1, the auxiliary tuner, labeled tuner n, is connected to supply program content to television set 10.

Using current tuner technology, the active channel tuner 14 and auxiliary tuners 16 select the desired channel by selecting the corresponding frequency band through band-pass filtering of the RF signal. While tuners of this type may be employed to implement the invention, other forms of digital "channel" selection are also envisioned, whereby the desired program content is extracted from the video data stream in the digital domain. For purposes of implementing the invention, the manner of channel selection depends upon the manner in which the television signals are encoded and broadcast.

Regardless of the form of the signals used to broadcast program material, the auxiliary tuners 16 are each set to monitor a different program channel, so that the closed caption text information and audio signal may be monitored by the system. The user selects which channels to monitor, using either on-screen menu selection or voiced meta-commands The system employs a speech recognizer 18 with which the user communicates through a suitable microphone 20. Microphone 20 may be incorporated into the television set or set top box, however the presently preferred embodiment incorporates the microphone into a hand-held remote control unit 22, which communicates with the television set or set top box by suitable link, such as an infrared or hard wired link.

Speech recognizer 18 works in conjunction with a set of speech models 24 representing all words recognizable by the system. The speech recognizer may be based on Hidden Markov Model (HMM) technology, or other suitable model-based recognition technology. The dictionary or lexicon of words recognizable by the system may include not only words, but letters of the alphabet, thereby allowing the system to recognize letters spoken by the user in spelling other new words. As will be more fully explained below, inclusion of speech models for letters of the alphabet allows the user to train the speech recognizer to learn new words even if a keyboard is not available for typing.

Speech recognizer 18, in effect, converts spoken utterances into text corresponding to the most probable word or phrase candidates (or letter candidates) recognized by the system. In the presently preferred embodiment, speech recognizer 18 outputs the N-best sentence candidates for each sentence utterance spoken by the user. The recognizer generates a probability score for each sentence, indicative of the likelihood that the sentence corresponds to the spoken utterance. The top N candidates are selected and fed to the word selector and semantic analyzer block 26 for further processing.

Word selector and semantic analyzer block 26 performs several functions. First, it resolves which of the N-best recognition candidates were actually intended by the user. Second, it analyzes the semantic content of the user's entire utterance, to determine additional information about the user's request that may not be gleaned from the individual words, themselves. Third, the semantic analyzer also analyzes the user's input to resolve recognition errors and to determine whether the user's input speech represents description of program content or represents meta-commands intended as instructions to effect system operation.

The word selector and semantic analyzer uses a combined local parser and global parser to select the correct candidate from the N-best candidates and also to perform semantic analysis. The details of these parser components are described more fully below. The word selector and semantic analyzer works with a dialog manager 28 that helps resolve ambiguities by prompting the user to supply additional information to specify either the program content or the meta-command.

Dialog manager 28 can supply either text prompt or voiced prompts. Text prompts are generated as alphanumeric text that is suitably injected into the video signal for on-screen display. Voiced prompts are supplied by a speech synthesizer within the dialog manager and may be injected into the audio stream for replay through the television speaker system.

If desired, a word history data store 30 may be provided to store a record of previously resolved word ambiguities, allowing the system to "learn" the user's viewing habits, thereby assisting the word selector in resolving subsequent word recognition ambiguities.

The word selector and semantic analyzer is designed to extract the meaning behind the user's request for a channel selection and it will automatically select applicable synonyms to improve the text matching process. Thus, if the word selector and semantic analyzer determines that the user is interested in watching a football game, synonyms and related words, such as "touch down," "kick-off," "NFL," "Superbowl," and the like are extracted from the word selector's synonym database 32.

The extracted words along with the user's originally spoken word are then sent to a word list buffer 34 that serves as a dynamic dictionary for the text matching processor 36. Text matching processor 36 receives individual streams of closed caption text data and/or audio data from the auxiliary tuner's 16 as that information is broadcast live and selected by the respective tuners. If audio data is supplied by an auxiliary tuner, text matching processor 36 employs the services of speech recognizer 18 to convert the audio stream into text data.

Text matching processor 36 compares each of the incoming text streams from the auxiliary tuners 16 with the words contained in word list buffer 34. If a match is detected, processor 36 signals the channel switcher 38, which, in turn triggers a number of different actions, depending upon the mode set by the user.

In a first mode, channel switcher 38 sends a command to the active channel tuner 14, causing the active channel tuner to immediately switch to the channel on which the detected word match occurred. The user is thus immediately switched to the channel containing the content he or she previously requested.

In a second mode, channel switcher 38 switches one of the auxiliary tuners (such as tuner n) to the channel that triggered the word match. In this mode, the viewer continues to watch the active channel, but is also presented with a picture-in-picture or a split screen view of the other channel detected.

In a third mode, the channel switcher activates a recorder 40, such as a DVD recorder, that will record the program on the tuner that triggered the word match. This mode allows the viewer to continue watching the active channel, while the system records the other selected channel for later viewing.

The speech recognizer that forms the heart of the word recognition system of the invention is preferably provided with a set of speech models 24 representing speaker independent word and letter templates for the most popular words used to describe program content. However, to give the system added flexibility, a model training processor 42 may be provided to allow an individual user to add words to the speech model dictionary. The model training processor 42 takes as its input two pieces of information: (a) speech information corresponding to new words the user wishes to add to the dictionary and (b) text information representing the spelling of those new words. Speech information is provided via microphone 20, in the same fashion as speech information is provided to recognizer 18. Text information may be provided via a keyboard 44 or other suitable text entry device, including on-screen text entry system employing the keypad buttons of the remote control 22.

As an alternate means of inputting text information, the speech recognizer 18 may be used. In this alternate mode, the speaker both speaks the new word and then spells it, by speaking into microphone 20. Speech recognizer 18 uses its speech models of spelled letters to interpret the spelled word input and correlate that with the spoken utterance representing the word itself. The model training processor 42 then constructs speech models using the same model parameters upon which the initially supplied speech models are based.

The word selector and semantic analyzer 26 performs the important function of making sense of the user's natural language spoken input. The task of the word selector and semantic analyzer is thus more complex than merely spotting keywords within a stream of speech recognized text. The analyzer extracts not only the important keywords but also the context of those words, so that the semantic content or meaning of the spoken input can be determined. The word selector and semantic analyzer employs a dual parser system for this purpose. That system is shown diagrammatically in FIG. 2.

Figure 2:
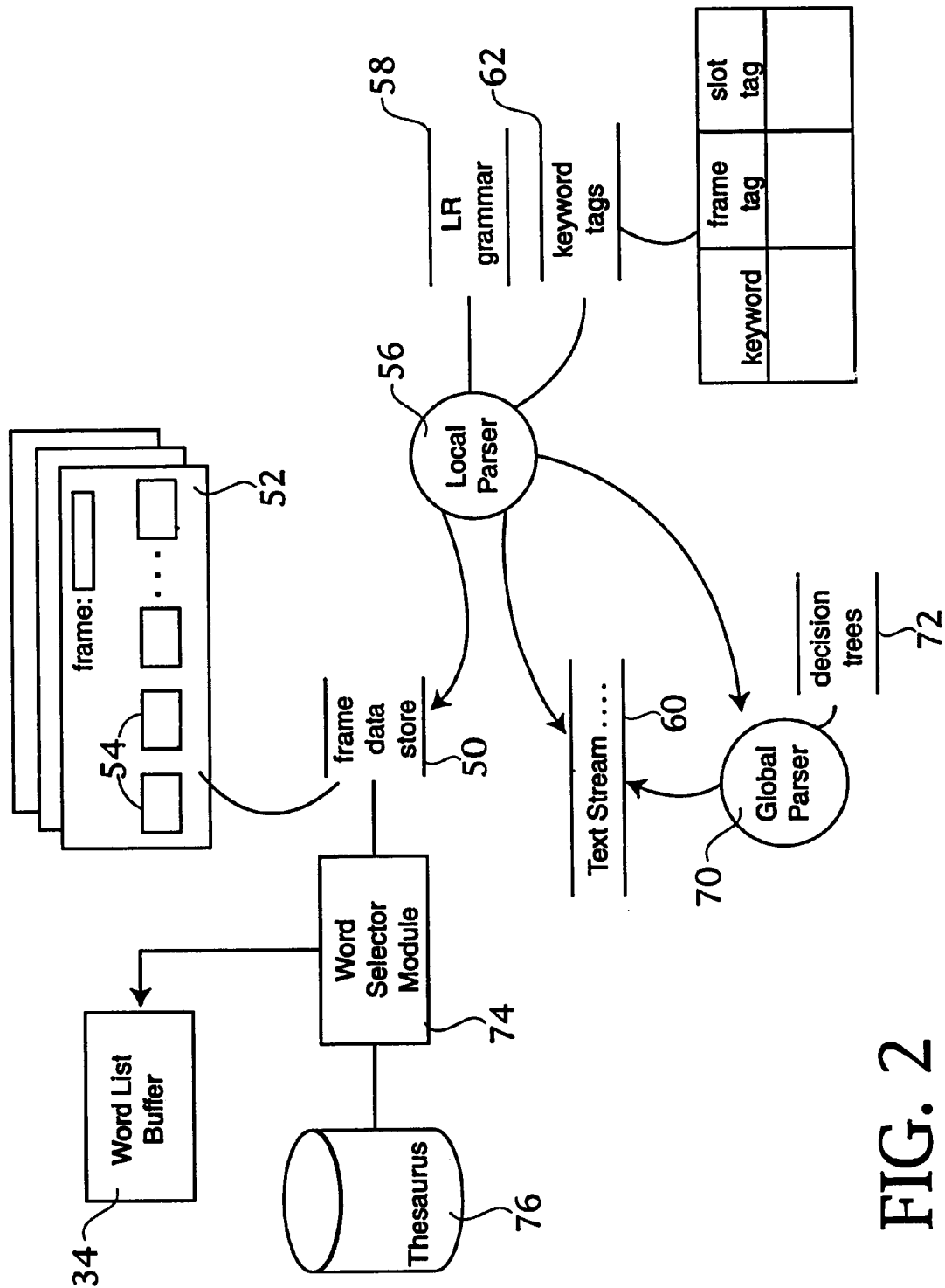
FIG. 2 is a data flow diagram illustrating the word selector and semantic analyzer component of the preferred embodiment.

Referring to FIG. 2, the analyzer maintains a frame data store 50 in which a plurality of task-based frames or templates are stored. The data structure of these templates is illustrated diagrammatically at 52. Each frame comprises a plurality of slots 54 into which extracted keywords are placed as the word selector and semantic analyzer operates.

A local parser 56, based on an LR grammar 58, parses the text stream 60 supplied by the speech recognizer 18 (FIG. 1). The LR grammar allows the local parser to detect and label sentence fragments within the text stream that contain important keywords used to select words for filling the word list buffer 34 (FIG. 1). For example, local parser 56 contains an LR grammar to extract the keyword "football" from the following sentence:

"I think I would like to watch a football game tonight."

Using its LR grammar, the local parser decodes the above sentence by examining the structure of the sentence and determines that the object of the sentence is "football game" and that the user has also specified a time frame parameter, namely "tonight".

Local parser 56 then accesses a data store of keyword tags 62 to extract meaning from the keywords and phrases. The keyword tags data store may be structured to give a frame tag and slot tag identifier for each phrase or keyword. The keyword "football" might have a frame tag of "sports" and a slot tag of "sports type." These keyword tags allow the local parser to determine which frame within data store 52 to use and which slot 54 the identified phrase or keyword should be assigned.

Each of the frames within frame data store 50 is goal-oriented. That is, each frame corresponds to a different media content selection task or system operation task. The range of tasks can be as varied as the user wishes. In a typical embodiment suitable for consumer applications, the system may be provided with a predefined set of frames corresponding to each of the available system operation commands and to a variety of typical program content requests. The user could thus speak into the system to perform a system command, such as instructing the system to record an identified program instead of displaying it through the active channel tuner. A user command such as:

"I want to record the Seinfeld re-run tomorrow night." would cause the system to enter a record mode. The above command would also be parsed by the local parser to identify the users requested program content, namely the Seinfeld re-run.

Similarly, the user could utter:

"I want to watch Seinfeld now."

This would cause the system to immediately switch channels to the one carrying the Seinfeld broadcast.

In some instances, the LR grammar of the local parser may not be sufficient to resolve the user's input without ambiguity. This will occur where the local parser identifies sentence fragments that, taken out of context, may have several meanings. For example, the following input:

"I want to watch Seinfeld and record it."presents the following ambiguity. The local parser may determine with equal validity that the program requested by the user is either (a) "Seinfeld" or (b) "Seinfeld And Record It."

To resolve such ambiguities, the system includes a second parser, the global parser 70. The global parser 70 also monitors the text stream as well as receiving input from the local parser 56. The global parser has a set of decision trees 72 that it uses to resolve ambiguities such as the one illustrated above. More specifically, global parser 70 has a set of decision trees 72, one decision tree for each meaning. Each decision tree is also in charge of solving ambiguities in the meaning represented. Each decision tree is a binary tree structure in which the root node and intermediate nodes each contain a question that may be answered either YES or NO. Answering a given question branches left or right to a successively lower node, depending on whether the answer was YES or NO. The final nodes or leaf nodes contain the determination of the meaning that has been expressed. The system uses this decision information to resolve ambiguities in selecting the proper frame from frame data store 50 and in assigning keywords to the proper slots.

After the frame data store has been populated by the local and global parsers, the word selector module 74 accesses the data store 50 to obtain the applicable list of keywords for sending to the word list buffer 34. The selector module may employ the services of an electronic thesaurus 76 to generate synonyms or additional words to enrich the key word list supplied to the word list buffer. The word list selector module might, for example, extract the word "football" from frame data store 50 and obtain additional words such as "touchdown," "Green Bay Packers," or "NFL" from the thesaurus 76. In this regard, note that the additional words selected need not necessarily constitute synonyms in the dictionary sense. Rather, they may constitute additional words or related words that are often found in natural language speech involving the subject of the user-specified key word.

From the foregoing, it will be appreciated that the automatic search mechanism of the invention greatly eases the task of identifying program material in a television system having access to many channels of information. While the invention has been described in its presently preferred embodiment, it will be understood that the invention is capable of modification and change without departing from the spirit of the invention as set forth in the appended claims.

What is claimed is:

1. A system receiving an input signal from a telecommunications infrastructure and displaying information on a display, the input signal having a plurality of information components derived from the input signal and being organized into channels, said system comprising:
   a speech recognizer for receiving a user-spoken request from a user and producing a first output;
   a systematic analyzer for processing the first output to produce a word list;
   a text pattern matcher for comparing the word list with the plurality of information components; and
   a channel selector operative to select a channel of the input signal in response to said text pattern matcher comparing the word list with the plurality of information components.

2. The system of claim 1 further comprising a plurality of digital tuners for parsing the input's signal into the information components.

3. The system of claim 2 wherein the speech recognizer further contains a plurality of speech models, each model representing either a sub-word unit or a letter template.

4. The system of claim 3 wherein the semantic analyzer contains a natural language analyzer which recognizes at least one of: synonymous, spelled word, system commands.

5. The system of claim 4 wherein the speech recognizer provides a plurality of likely requests and the word selector determines which request in the word list will be used in the search.

6. The system of claim 5 wherein the semantic analyzer stores historical information or past searches and uses historical information in its determination of which words from the word list will be searched.

7. The system of claim 5 wherein the word selector semantic analyzer contains a local parser and a global parser.

8. The system of claim 5 wherein the word selector semantic analyzer provides synonyms of search terms to the text pattern matcher.

9. The system of claim 5 wherein the text pattern matcher compares the word list to the data from the plurality of tuners.

10. The system of claim 1, wherein the channel selected for display corresponds to a matching channel having matching information components that correspond at least in part to the word list.

11. The system of claim 10, wherein the matching information components correspond to closed-caption/audio content composed of text that corresponds at least in part to the word list.

12. The system of claim 10, wherein the word list contains a synonym of a word of which the user-spoken request is comprised.

13. A method for selecting a channel for display in a telecommunications system, the method comprising:

receiving an input signal having a plurality of channels, wherein at least one channel includes an information component;

receiving a user-spoken request comprised of at least one user-spoken word;

recognizing at least one recognized word corresponding to the user-spoken word;

generating a word list based on the recognized word;

comparing the word list to the information component; and displaying the channel as a result of comparing the word list to the information component.

14. The method of claim 13, wherein the information component corresponds to closed-caption/audio content of the channel.

15. The method of claim 13, wherein the word list includes a synonym of the recognized word.

16. The method of claim 13, wherein said displaying of the channel is further defined to occur as a result of a successful search for matching content between the word list and the information component.

* * * * *

UNITED STATES PATENT AND TRADEMARK OFFICE
CERTIFICATE OF CORRECTION

PATENT NO.   : 6,480,819 B1
DATED        : November 12, 2002
INVENTOR(S)  : Robert Boman et al.

It is certified that error appears in the above-identified patent and that said Letters Patent is hereby corrected as shown below:

<u>Title page,</u>
Item [56], References Cited, OTHER PUBLICATIONS, "P.J. Wyard et al.", "1999" should be -- 1996 --.

Signed and Sealed this

Twenty-ninth Day of July, 2003

JAMES E. ROGAN
*Director of the United States Patent and Trademark Office*